United States Patent [19]

Engel

[11] Patent Number: 5,678,601
[45] Date of Patent: Oct. 21, 1997

[54] COMPACT CONTROLLER FOR CONTROL VALVE

[76] Inventor: Hans O. Engel, Hoehenstr. 25, D-63454 Hanau 6, Germany

[21] Appl. No.: 516,037

[22] Filed: Aug. 17, 1995

[30] Foreign Application Priority Data

Sep. 3, 1994 [DE] Germany .......................... 44 31 463.9

[51] Int. Cl.⁶ .......................... F16K 31/128; G05D 7/06
[52] U.S. Cl. .......................... 137/486; 137/487.5
[58] Field of Search .......................... 137/486, 487, 137/487.5

[56] References Cited

U.S. PATENT DOCUMENTS

| | | | |
|---|---|---|---|
| 2,536,184 | 1/1951 | Johnson | 251/29 X |
| 4,481,967 | 11/1984 | Frick | 137/487.5 X |
| 4,509,403 | 4/1985 | Gassman et al. | 137/84 X |
| 4,534,376 | 8/1985 | Brown | 137/487.5 X |
| 4,665,938 | 5/1987 | Brown et al. | 137/487.5 X |
| 5,469,877 | 11/1995 | Askew | 137/487.5 X |
| 5,549,137 | 8/1996 | Lenz et al. | 137/486 |

*Primary Examiner*—Gerald A. Michalsky
*Attorney, Agent, or Firm*—Arthur A. Sapelli; Anthony Miologos

[57] ABSTRACT

A compact controller controls a control valve, wherein the control valve is actuated by a pneumatic actuator. The controller comprises control electronics for generating a control deviation signal. The control deviation signal is derived from the difference between an electrical standard set value signal and a converted electrically measured value signal. The converted electrically measured value signal is a measured value signal, the measured valve signal being a signal corresponding to a value of a predetermined process variable. An electropneumatic (E/P) signal transducer converts the control deviation signal into a pneumatic pressure signal for the pneumatic actuator. Thus, the controller provides control to the control valve, and further the controller is directly flanged to the pneumatic actuator.

8 Claims, 2 Drawing Sheets

COMPACT CONTROLLER FOR CONTROL VALVE

BACKGROUND OF THE INVENTION

The present invention relates to valve controllers, and more particularly, to a compact controller for a control valve controlled by a pneumatic actuator.

Control valves are used to a great extent in key industries with process automation and are controlled by process management systems. The process management systems issue commands for the control of the control valves in the field in the form of electrical/electronic signals, whereas until today the valves themselves in an overwhelming majority are actuated by pneumatic actuators. This necessitates the conversion of an electrical standard signal within the range of 4–20 mA into corresponding pressure signal of e.g., 0.2–1.0 bar. For the conversion, well-known electropneumatic (E/P) converters are used, which consists of a nozzle/baffle blade system. The baffle blade is controlled by means of a solenoid or consists of a piezo blade which is electrically driven. Since E/P-transducers often depend on their positioning, it is already known to convert back the output pressure (measured value) into an electrical signal and to compare it with the standard set value. However, since inaccuracies with regard to the positioning due to hysteresis cannot be prevented, i.e., by friction of the valve rod within the gland, position controllers having constant control of the control device is required. The current state of the art may be taken from British Patent 1 551 039.

Position controllers show a plurality of advantages, but in spite of a remarkably improved functionality and reliability, they still show a number of disadvantages and points of weakness. The adjustment is time-consuming and not always simple since a range variation commonly involves a zero drift and vice versa. In addition, position controllers are relatively costly and contribute considerably to the total price of the control device. Furthermore, they often aggravate a stable control operation because of high amplification which often is not adjustable. This forces the user to compromise between high amplification and a respective position accuracy or reproducibility, and stability of the position control loop, which must be guaranteed with priority. Furthermore, position controllers do not allow a universal application. This is due to their behavior. For example, with high speed control systems such as with liquid pressure controls, a position controller in most cases must be omitted since a stable control operation is not often attainable. The main disadvantage of the position controller is in the fact that a mechanical pick-up of the valve or drive stroke of a rotation angle, is necessary. Mounting the position controller at the pneumatic actuator including the pick-up of the stroke are standardized in order to be able to mount any position controller to any actuator. This standardized mounting has been criticized recently because of a potential danger of injury. Some manufacturers therefore have provided a special non-standard mounting where the stroke pick-up is accordingly protected.

Today, the users make claims which cannot be satisfied either by the analog position controller used until the present time, or by the modern digital bus-controlled positioners. Thus a need exists for a relief of the process management system from simple control operations. The control of the present invention is done in the field, whereby the controller is not further arranged in the central station or forms part of the process management system, but is integrated within the signal transducer. This requires dialogue capability of the field equipment in order to be able to change the set value from the central station. The function of the process management system then is mainly restricted to a monitoring function. Furthermore, short connection paths of the different components such as the sensor, controller, and actuator, dramatically reduce the expenses for cabling and tubing. Finally a need exists for the integration of different functions in order to increase the information content of the communication between the control device and the central station.

SUMMARY OF THE INVENTION

Thus, there is provided by the present invention a compact controller for a control valve being controlled by a pneumatic actuator. The controller comprises control electronics for generating a control deviation signal. The control deviation signal is derived from the difference between an electrical standard set value signal and a converted electrically measured value signal. The converted electrically measured value signal is a measured value signal, the measured value signal being a signal corresponding to a value of a predetermined process variable. An electropneumatic (E/P) signal transducer converts the control deviation signal into a pneumatic pressure signal for the pneumatic actuator. Thus, the controller provides control to the control valve, and further the controller is directly flanged to the pneumatic actuator.

Accordingly, it is the object of the present invention to provide a compact controller.

It is another object of the present invention to provide a compact controller whereby the control is done in the field.

It is still another object of the present invention to provide a compact controller for controlling a control valve.

These and other objects of the present invention will become more apparent when taken in conjunction with the following description and attached drawings, wherein like characters indicate like parts, and which drawings form a part of the present application.

DETAILED DESCRIPTION

Figure 1:
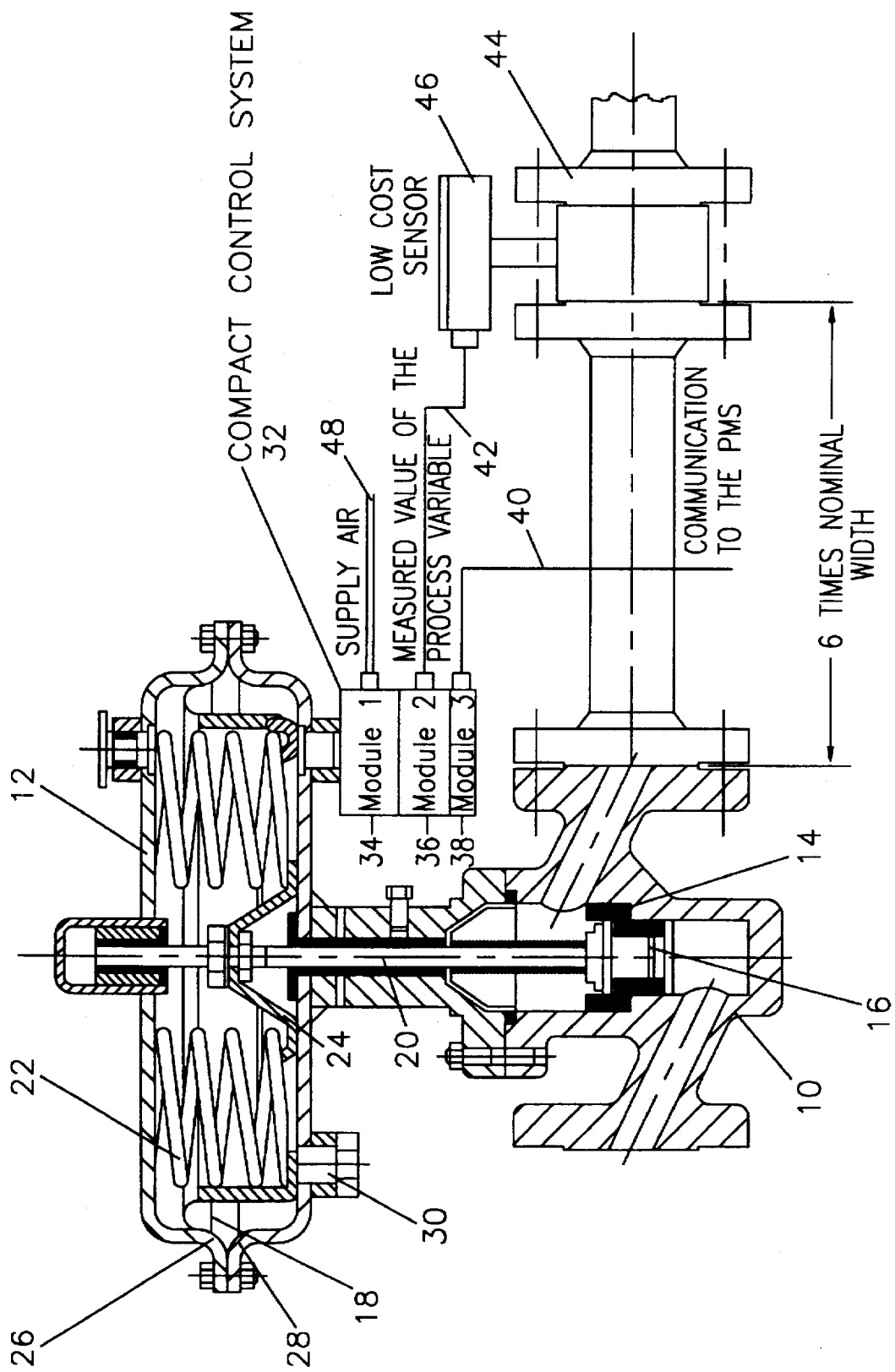
FIG. 1 shows a section drawing of the complete control device of the preferred embodiment of the present invention including a control valve, a pneumatic actuator, a measuring device for the process variable, and a compact controller.

Referring to FIG. 1, a pneumatic diaphragm actuator 12 of common design is mounted on the upper portion of a control valve 10. The diaphragm actuator 12 controls the stroke position of a closing body 16 acting together with a valve seat 14 by raising a valve stem 20 connected to the closing body 16 against the force of a biasing spring 22 as a function of a pneumatic pressure signal applied to a diaphragm 18. The valve stem 20 herewith is suspended at a spring plate 24, which itself is suspended at the diaphragm 18 which is clamped between two housing portions 26, 28 of the actuator 12. Each housing portion of the actuator 12 is provided with one or a plurality of thread holes 30 for pneumatic fittings.

A compact control system 32 is directly connected to the diaphragm actuator 12 by means of such a thread hole 30. The compact control system 32 consists of a pneumatic module 34 and a control module 36 and optionally of an interface module 38 for the connection to a field bus 40.

The measured value for the control module 36 is taken from the process variable itself and is fed via a line 42 to the control module 36. Due to the direct feedback of the process variable, the pneumatic module 34 with a signal transducer is implemented very simply since a drift—in contrast to a direct control with a position controller—does not detrimentally act onto the accuracy or reproducibility, respectively, as long as a good sensitivity of response is guaranteed. In the present case it may be assumed that the process variable is the flow quantity. For measuring of the flow quantity a certain distance from the control valve 10 (which may be approximately six times the nominal width of the tube), a flow meter 44 of known design is arranged with its signal being converted within a transducer 46 into an electrical signal which is applied to the control module 36. As a matter of course the process variable may be another quantity as e.g., temperature, pressure, . . . .

The pneumatic module 34 is fed with supply air under pressure from a source (not shown) via a hose or a tube 48, respectively. This connection is the sole line under pressure. A further tubing is not provided. Movable parts, as e.g., with a position controller which are accessible from the outside and which possibly represent a danger of injury, are not present.

Figure 2:
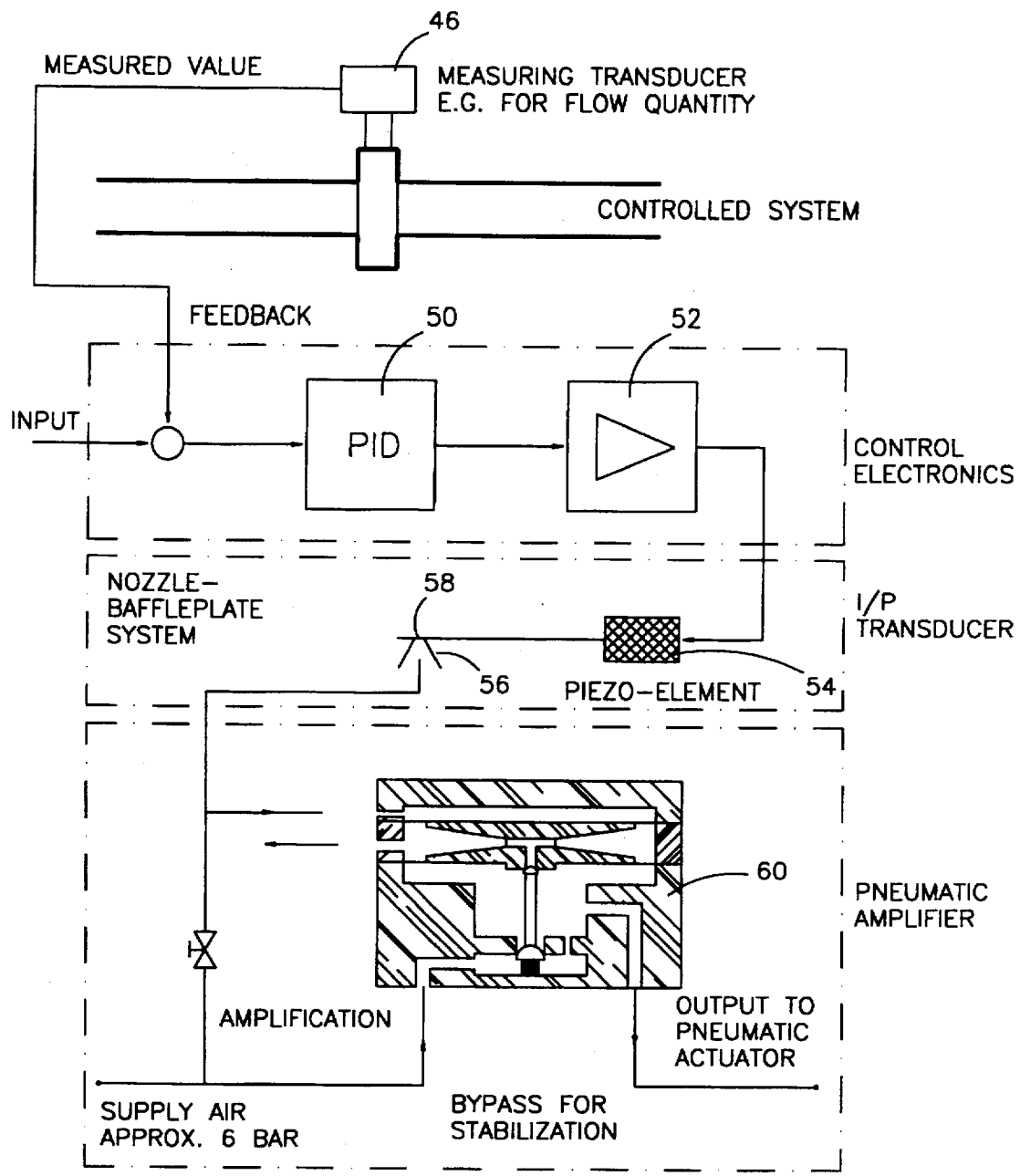
FIG. 2 shows a functional logic diagram of the compact control system of the present invention.

FIG. 2 shows the complete control system which consists of known elements and needs no further explanation with respect to its design and operation. The electrical measured value outputted from the measuring transducer 46 is compared to the standard set value signal and the difference, i.e., the control deviation feeds a piezo element 54 via a PID controller 50 and an amplifier 52 whereas the element 54 is moving a baffle plate 58 covering a nozzle 56 or where the element 54 itself is formed as a baffle plate. The variable pneumatic pressure signal is fed to the pneumatic actuator via a pneumatic volume amplifier 60.

The I/P-Transducer consisting of the piezo element 54 and the nozzle/baffle plate system 56, 58 may be part of the controller module 36 or part of the pneumatic module 34.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A controller for controlling a control valve, wherein the control valve is actuated by a pneumatic actuator, including a port for receiving pneumatic pressure the controller comprising:

a) control electronics for generating a control deviation signal, the control deviation signal being derived from the difference between an electrical standard set value signal and a converted electrically measured value signal, the converted electrically measured value signal being derived from a measured value signal, the measured value signal being a signal corresponding to a value of a predetermined process variable; and b) an electropneumatic (E/P) signal transducer for converting the control deviation signal into a pneumatic pressure signal for the pneumatic actuator, said controller directly mounted to said port, and said pneumatic pressure signal is applied to said port and to said pneumatic actuator, the controller thereby providing control to the control valve.

2. A controller according to claim 1, further comprising:

an interface module for connecting to a process management system via a field bus.

3. A controller according to claim 2, further comprising:

a) a transducer device for measuring the predetermined process variable; and b) a sensor for converting the predetermined process variable to the converted electrically measured value signal.

4. A controller according to claim 3, wherein the predetermined process variable is a measurable parameter, and further wherein the transducer device is arranged a short distance in either direction from the control valve.

5. A controller according to claim 4, further comprising:

a flow meter arranged a predetermined distance with respect to the control valve, the distance being at least six times the nominal width of a pipe in which the flow meter is installed.

6. A controller according to claim 1, further comprising:

a) a transducer device for measuring the predetermined process variable; and b) a sensor for converting the predetermined process variable to converted electrically measured value signal.

7. A controller according to claim 6, wherein the predetermined process variable is a measurable parameter, and further wherein the transducer device is arranged a short distance in either direction from the control valve.

8. A controller according the claim 7, further comprising:

a flow meter arranged a predetermined distance with respect to the control valve, the distance being at least six times the nominal width of a pipe in which the flow meter is installed.

* * * * *